United States Patent
Schmidt

[15] 3,648,971
[45] Mar. 14, 1972

[54] TAP

[72] Inventor: Albert F. Schmidt, Paris, France

[73] Assignee: Ressorts du Nord S.A., Paris, France

[22] Filed: Apr. 16, 1970

[21] Appl. No.: 29,052

[30] Foreign Application Priority Data

Apr. 21, 1969 France....................................6912390

[52] U.S. Cl............................................................251/252
[51] Int. Cl.................................................F16k 31/524
[58] Field of Search.................251/215, 251, 252, 253, 256, 251/257, 258, 260

[56] References Cited

UNITED STATES PATENTS

| 460,728 | 10/1891 | Sandlass | 251/252 |
| 2,306,535 | 12/1942 | Golden | 251/252 X |
| 3,516,639 | 6/1970 | Himmelman | 251/257 |

Primary Examiner—M. Cary Nelson
Assistant Examiner—David R. Matthews
Attorney—Burns, Doane, Swecker & Mathis

[57] ABSTRACT

Screw-down tap in which the closing member is applied against the valve seat by rotatable actuating means having a lower helical ramp. The latter coacts with a helical ramp on the closing member. The closing member has a cylindrical stem which is parallel to the axis of the closing member and extends inside the actuating means. The helical ramp on the closing member surrounds at least a part of the stem.

4 Claims, 3 Drawing Figures

PATENTED MAR 14 1972   3,648,971

TAP

The present invention relates to screw-down taps employed usually in sanitary, industrial, central heating, and other installations.

Most screw-down taps employed at the present time in these installations usually have a screw device for actuating the closing member.

In order that these taps be easy to actuate and that the whole of the periphery of the closing member bear against the valve seat, it is necessary to provide a large clearance between the threads of the screw device and this considerably reduces the surface of contact between the screw and the support of the closing member.

Subsequently, this surface of contact is usually reduced to a single point of contact which in most cases is offset relative to the axis of the closing member so that the pressure of the closing member cannot be evenly distributed over the seat.

Further, rapid wear of the screw threads occurs owing to the reduction in the surfaces of contact of the screw threads. This wear is still further increased since, in order to obtain a complete opening of the tap, it is necessary to effect several rotations of the device and this constitutes, moreover, a further drawback of this type of tap.

The object of the invention is to remedy these drawbacks and to provide a tap in which large surfaces of contact are provided between the closing member and the means actuating the latter.

Taps are known in which the axis of the actuating means is offset relative to the axis of the closing member as described, for example, in U.S. Pat. No. 1,494,890 or in the British Pat. 471,254.

Taps are also known in which the actuating means is of cylindrical and tubular form having a lower end constituting a helical ramp which cooperates with a corresponding helical ramp formed on the closing member, as described in French Pat. 1,523,635.

The invention provides consequently a screw-down tap, that is a tap in which the closing member is shifted in a direction perpendicular to the valve seat, of the type comprising a rotatable, cylindrical and tubular actuating means having a lower end which constitutes a helical ramp cooperating with a complementary helical ramp on a closing member of the tap, wherein said closing member comprises a cylindrical stem parallel to the axis of the closing member and extending inside the tubular actuating means, said complementary helical ramp formed on the closing member surrounding at least a part of said cylindrical stem of the closing member.

According to another feature of the invention, the axis of said stem is laterally offset relative to the axis of the closing member.

According to one embodiment of the invention, said helical ramp formed on the closing member intersects the axis of the latter.

Preferably, the surface of the helical ramp formed on the closing member is, when viewed in plan, in two parts which are roughly equal and divided by a diameter of the closing member.

Further features and advantages of the invention will be apparent from the ensuing description with reference to the accompanying drawing.

Figure 1:
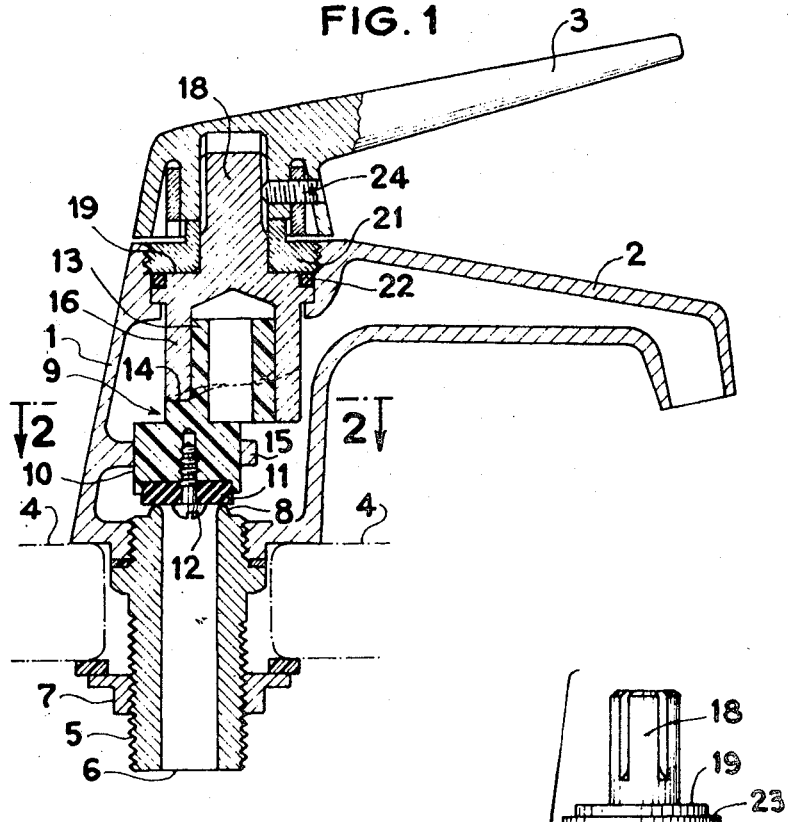
FIG. 1 is a side elevational and sectional view of a tap according to the invention.

With reference to the drawing, the tap according to the invention comprises in a conventional manner a body 1 having a spout 2, and a knob 3. The tap is mounted on a support 4 by screwing the body on a screw-threaded end 5 of a fluid supply pipe 6, the body being clamped on the support 4 by means of a nut 7.

Although in the illustrated embodiment the annular valve seat 8 of the closing member or valve is integral with or formed directly on the pipe 6, it must be understood that this seat could be constituted by an attached member.

The closing member 9 comprises a cylindrical body 10 whose lower face is hollowed out for receiving a suitable fitting or seal 11. The latter is for example fixed by means of a screw 12. A stem 13 integral with the body extends axially from the opposite end of the body of the closing member.

As can be seen in the drawing, the axis of the stem 13 is laterally offset relative to the axis of the body 10 of the closing member 9, the axis of the stem 13 being however preferably within the periphery of the body 10.

Figure 3:
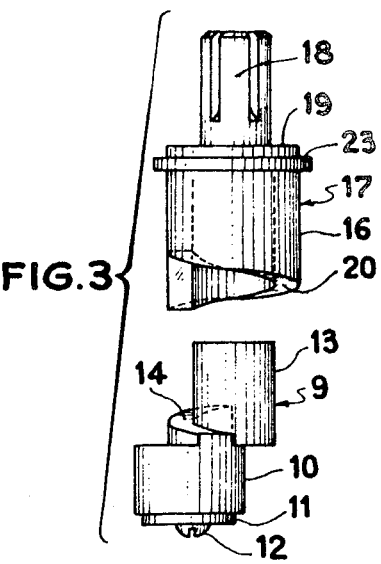
FIG. 3 is a side elevational view of the actuating means and closing member.

At the junction of the stem 13 with the body 10 of the closing member, there is formed a ramp 14 which is also integral with the closing member and has a helical profile, as can be seen better in FIG. 3.

Figure 2:
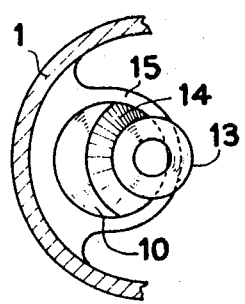
FIG. 2 is a partial sectional view taken along line 2—2 of FIG. 1.

This ramp 14 partly surrounds the base of the stem 13 and constitutes a shoulder having a helical face between the stem and the body 10, this face intersecting the axis of the body 10 and being divided into two roughly equal parts by a diameter of the body 10 which intersects the axis of the stem 13 (FIG. 2).

The body 10 of the closing member is maintained in the body 1 of the tap by means of a ring 15 which is integral with the body 1 and extends inwardly of the latter radially relative to the body 10 which it surrounds while allowing the body 10 to slide axially.

The stem 13 extends vertically upwardly from the body 10 inside a hollow cylindrical portion 16 of an actuating means 17 in which it is rotatable without appreciable play. The actuating means 17 has in its upper part a splined spindle 18 which defines with the cylindrical portion 16 a shoulder 19.

Further, formed on the periphery of the lower end of the cylindrical portion 16 is a helical ramp 20 which has one helix and is complementary to and in contact with the helical ramp 14 formed on the closing member 9.

The actuating means 17 is rotatably mounted in the body 1 of the tap by a screw-threaded collar 21 which bears against the shoulder 19 and is screwed in the body 1, a toric sealing ring 22 being disposed in a suitable recess 23 provided around the shoulder 19.

The spindle 18 of the actuating means 17 is secured to the control knob 3 by means of a setscrew 24.

When the control knob 3 is rotated, the actuating means 17 is rotated about its axis. This rotation results in a sliding of the helical ramp 20 on the ramp 14 of the closing member 5. This sliding does not result in a rotation of the closing member owing to the fact that the ramp 14 intersects its axis.

Depending on the direction in which the control knob 3 is rotated, the ramp 20 of the closing means acts on the ramp 14 of the closing member 9 so as to urge the latter towards its seat 8 or move it away from the ramp 14. In this case, the pressure of the fluid in the pipe 6 exerted on the closing member 9 moves the latter away from the seat 8 and the fluid is able to flow through the spout of the tap.

It will be observed that, owing to the arrangement of the closing member 9, the face of the ramp 14 contains roughly the whole of the diameter of the body 10 of the closing member.

Consequently, the action of the ramp 20 on the ramp 14 for applying the closing member 9 against the seat 8 is always exerted along the axis of the closing member and this results in a very good distribution of the pressure.

Wear in the component parts of the tap is easily taken up by increasing the angle of rotation of the actuating means.

Having now described my invention what I claim as new and desire to secure by Letters Patent is:

1. A screw-down tap comprising a body, a cylindrical and tubular actuating means rotatable relative to said body and having a lower end portion which constitutes a helical ramp, a valve seat within said body, a closing member movable relative to said valve seat along an axis and having a helical ramp adapted to coact with said ramp on said actuating means for applying said closing member against said seat, said closing member comprising a body coaxial with said axis and a cylindrical stem extending inside the tubular actuating means, said stem being parallel to said axis and laterally offset relative to said body and axis, said helical ramp on said closing member surrounding at least a part of said cylindrical stem.

2. A tap as claimed in claim 1, wherein said helical ramp on said closing member intersects said axis.

3. A tap as claimed in claim 2, wherein the face of said helical ramp on said closing member, when viewed in plan, is divided into two substantially equal parts by a diameter of the closing member.

4. A tap as claimed in claim 2, wherein said closing member has a circular cross-sectional shape and the face of the helical ramp on said closing member contains substantially the whole of a diameter of said closing member.

* * * * *